US012764486B2

(12) United States Patent
Chen et al.

(10) Patent No.: US 12,764,486 B2
(45) Date of Patent: Oct. 13, 2026

(54) SYSTEM AND METHOD TO USE DEEP NEURAL NETWORK TO GENERATE HIGH-INTELLIGIBILITY BINAURAL SPEECH SIGNALS FROM SINGLE INPUT

(71) Applicant: Northwestern Polytechnical University, Xi'an (CN)

(72) Inventors: Jingdong Chen, Xi'an (CN); Ningning Pan, Xi'an (CN); Yuzhu Wang, Xi'an (CN); Jacob Benesty, Xi'an (CN)

(73) Assignee: Northwestern Polytechnical University, Xi'an (CN)

( * ) Notice: Subject to any disclaimer, the term of this patent is extended or adjusted under 35 U.S.C. 154(b) by 238 days.

(21) Appl. No.: 18/282,398

(22) PCT Filed: Jun. 30, 2021

(86) PCT No.: PCT/CN2021/103480

§ 371 (c)(1),
(2) Date: Sep. 15, 2023

(87) PCT Pub. No.: WO2023/272575

PCT Pub. Date: Jan. 5, 2023

(65) Prior Publication Data

US 2024/0163627 A1 May 16, 2024

(51) Int. Cl.
*H04S 7/00* (2006.01)
*G10L 19/008* (2013.01)
(Continued)

(52) U.S. Cl.
CPC ............ *H04S 7/302* (2013.01); *G10L 19/008* (2013.01); *G10L 25/30* (2013.01); *H04S 1/007* (2013.01);
(Continued)

(58) Field of Classification Search
CPC ........... G06F 3/162; G06F 17/00; G06F 16/60
(Continued)

(56) References Cited

U.S. PATENT DOCUMENTS 10,665,011 B1 * 5/2020 Sunkavalli ............. G06N 3/084
12,277,169 B2 * 4/2025 Li ........................... G06F 40/30
(Continued)

FOREIGN PATENT DOCUMENTS

CN 102714038 A 10/2012
WO 2018012705 A1 1/2018
WO 2020178475 A1 9/2020

OTHER PUBLICATIONS

International Search Report and Written Opinion dated Apr. 1, 2022 received in PCT/CN2021/103480, pp. 9.
(Continued)

*Primary Examiner* — Alexander Krzystan
(74) *Attorney, Agent, or Firm* — Zhong Law, LLC

(57) ABSTRACT

A system and method of generating binaural signals includes receiving, by a processing device, a sound signal including speech and noise components, and transforming, by the processing device using a deep neural network (DNN), the sound signal into a first signal and a second signal. The transforming further includes encoding, by an encoding layer of the DNN, the sound signal into a sound signal representation in a latent space, rendering, by a rendering layer of the DNN, the sound signal representation into a first signal representation and a second signal representation in the latent space, and decoding, by a decoding layer of the DNN, the first signal representation into the first signal and the second signal representation into the second signal.

16 Claims, 7 Drawing Sheets

(51) Int. Cl.
*G10L 25/30* (2013.01)
*H04S 1/00* (2006.01)

(52) U.S. Cl.
CPC ....... *H04S 2400/09* (2013.01); *H04S 2400/11* (2013.01); *H04S 2400/13* (2013.01); *H04S 2420/01* (2013.01)

(58) Field of Classification Search
USPC ............................................................ 700/94
See application file for complete search history.

(56) References Cited

U.S. PATENT DOCUMENTS

| | | | | |
|---|---|---|---|---|
| 2010/0125352 | A1 | 5/2010 | Yamada et al. | |
| 2010/0215164 | A1 | 8/2010 | Ericsson et al. | |
| 2016/0247518 | A1 | 8/2016 | Schuller et al. | |
| 2020/0196024 | A1* | 6/2020 | Hwang | G06N 3/04 |
| 2021/0304002 | A1* | 9/2021 | George | G06F 21/562 |
| 2022/0292134 | A1* | 9/2022 | Shahbazi Mirzahasanloo | G06F 21/32 |
| 2023/0164509 | A1* | 5/2023 | Sporer | H04S 3/008 381/309 |
| 2023/0229892 | A1* | 7/2023 | Biswas | G06N 3/0455 704/500 |
| 2023/0245382 | A1* | 8/2023 | Gardner | G06N 3/045 345/426 |
| 2024/0163627 | A1* | 5/2024 | Chen | H04S 1/007 |

OTHER PUBLICATIONS

Jin et al., "Heterophasic Binaural Differential Beamforming for Speech Intelligibility Improvement," IEEE Transactions on Vehicular Technology,No. 11, vol. 69, Nov. 30, 2020, pp. 13498.
CNIPA First notice of examination opinion for CN202180099543, dated May 21, 2026.

* cited by examiner

Ground Truth | Experimental Results

600

SYSTEM AND METHOD TO USE DEEP NEURAL NETWORK TO GENERATE HIGH-INTELLIGIBILITY BINAURAL SPEECH SIGNALS FROM SINGLE INPUT

CROSS-REFERENCE TO RELATED APPLICATIONS

This application is the U.S. national stage of PCT/CN2021/103480 filed Jun. 30, 2021, which is hereby incorporated in reference in its entirety.

TECHNICAL FIELD

This disclosure relates to speech enhancement and, in particular, to designing and training a deep neural network (DNN) to generate binaural signals with non-homophasic speech and noise components from a single-channel input.

BACKGROUND

One of the challenges in the field of acoustic signal processing is to improve the intelligibility and/or quality of a sound signal, where the sound signal may include a speech component of interest which has had its observations corrupted by an unwanted noise component. Many methods have been developed to address this problem including, for example, optimal filtering techniques, spectral estimation procedures, statistical approaches, subspace methods, and deep learning based methods. While these methods may achieve some success in improving the signal-to-noise ratio (SNR) and speech quality, the aforementioned methods share some common drawbacks with respect to speech intelligibility.

BRIEF DESCRIPTION OF THE DRAWINGS

The present disclosure is illustrated by way of example, and not by way of limitation, in the figures of the accompanying drawings.

DETAILED DESCRIPTION

Figure 1:
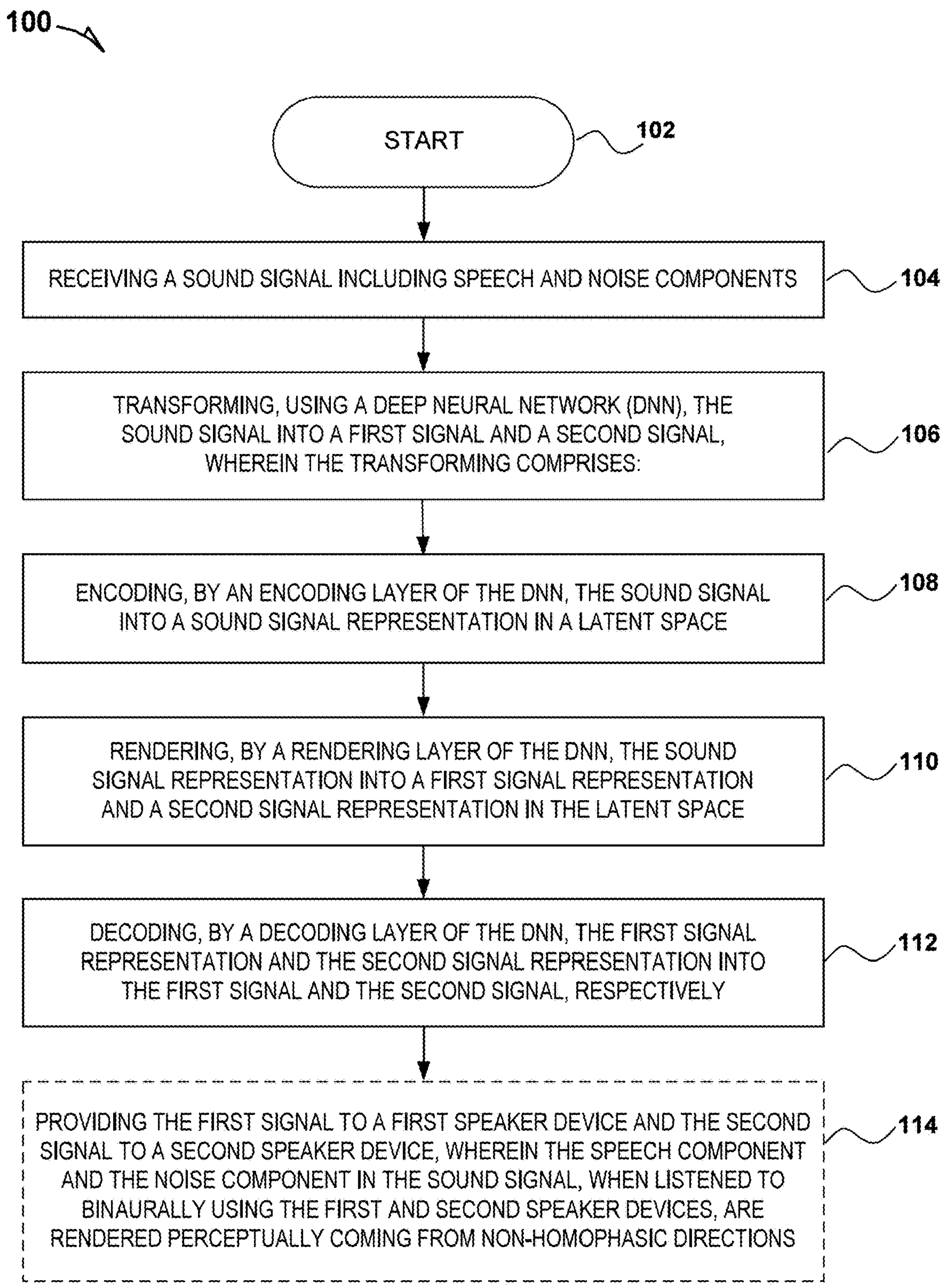
FIG. 1 shows a flow diagram illustrating a method for generating binaural signals that contain speech and noise components which are rendered perceptually coming from non-homophasic directions, according to an implementation of the present disclosure.

Current approaches to noise reduction are achieved at the cost of adding speech distortion so that the more a noise is reduced, the more speech of interest is distorted. Another such drawback relates to the output signal, these methods produce only a single output which does not take advantage of the human binaural hearing system, e.g., two ears. As a result, these methods may not be able to significantly improve speech intelligibility.

As noted above, a deep neural network (DNN) may be used in speech processing. Neural networks are machine learning models that employ one or more layers of nonlinear units to predict outputs with respect to a received input. Some neural networks (e.g., DNN) include one or more hidden layers in addition to an output layer. The output of each hidden layer is used as input to the next layer in the neural network, i.e., the next hidden layer or the output layer. Each layer of the neural network generates an output from a received input in accordance with current values of a respective set of parameters.

A convolutional neural network (CNN) is a form of DNN that employs a mathematical operation called convolution which operates on two functions to produce a third function that specifies how the shape of one function is modified by the shape of the other. The term convolution may refer to the resulting third function and/or to the process of computing it. CNNs may use convolution in place of general matrix multiplication in at least one of their layers. One form of CNN is the temporal convolutional network (TCN). The TCN may be designed with respect to two principles: 1) there is no information leakage from the future into the past, and 2) the network produces an output of the same length as the input. In accordance with the first principle, the TCN may use causal convolutions, convolutions where an output at a time "t" is convolved only with elements from time t and elements from an earlier time in the previous layer. In accordance with the second principle, the TCN may use a 1D fully-convolutional network (FCN) architecture, where each hidden layer has the same length as the input layer, and no padding of length is used to keep the length of any subsequent layers the same as the length of the previous layers.

Simple causal convolutions have the disadvantage of only looking back at history of size that is linear with respect to the depth of the network, i.e. the receptive field grows linearly with every additional layer of the network. In order to address this issue, the TCN architecture may employ dilated convolutions that enable an exponentially large receptive field by inserting holes/spaces between kernel elements. An additional parameter (e.g., dilation rate) may indicate how much the kernel is expanded at each layer.

As noted above, improving the intelligibility of a speech signal that has been corrupted by additive noise has been a challenging problem. In the present disclosure, a deep learning based method is described which renders the noise and the speech of interest in the perceptual space such that the perception of the desired speech is least affected by the added noise. A temporal convolutional network (TCN) based structure is adopted to map single-channel noisy observations into two binaural signals, one for the left ear and the other for the right ear. The TCN may be trained in such a way that the desired speech and the noise will be perceived to be coming from different directions by a listener who listens to the binaural signals with their corresponding left and right ears (e.g., using headphones). This type of binaural presentation (e.g., non-homophasic) enables the listener to better distinguish the desired speech from the annoying added noise for improved speech intelligibility.

A single-input/binaural-output (SIBO) speech enhancement method and system are described herein. It is observed in psychoacoustics that binaural presentation of a sound signal may significantly improve speech intelligibility compared to a monaural presentation of the same signal so long as the binaural presentation of the signal is rendered properly. Binaural presentations may be broadly classified into three types depending on the relative regions where the speech and noise components of the sound signal are rendered in a listener's perceptual space: antiphasic, heterophasic, and homophasic. In the antiphasic presentation the speech and noise components of the signal are rendered binaurally so that they when rendered to listening devices (e.g., headphones, speakers etc.) are perceived to be coming from opposite directions, resulting in the highest speech intelligibility (e.g., as shown in experimental results below). The second effective enhancement is the heterophasic presentation where the speech component is rendered perceptually to be coming from the middle of the listener's head while the noise component is rendered perceptually on the two sides of the head (e.g., noise in the left channel is perceived on the left-hand side while noise in the right channel is perceived on the right-hand side of the head). In comparison to the aforementioned non-homophasic presentations (e.g., antiphasic and heterophasic), the homophasic presentation in which the speech and noise components are rendered perceptually to be coming from the same region (e.g., identical to a monaural presentation) is the less effective enhancement to the intelligibility of the speech component.

A TCN based end-to-end rendering network may be adopted to achieve the binaural presentation. The TCN may commonly include an encoder, a rendering net, and a decoder. The encoder may take single-channel noisy observations of speech as inputs and encode (e.g., via convolution) them as representations in a latent space of the TCN, where the latent space includes representations of compressed data (e.g., vectors representing features extracted from sound signals) in which similar data points are projected to be closer together in the latent space. Then, the rendering net may include rendering functions that may transform the encoded representations of the single-channel noisy observations into binaural representations in the latent space. Finally, the decoder may deconvolve the binaural latent representations into two waveform-domain signals, one signal for the left ear and the other signal for the right ear (e.g., binaural signals). In order to improve the intelligibility of the speech, two waveform-domain signals generated by the TCN should be in forms to be perceived in a listener's perceptual antiphasic or heterophasic space.

The initial noisy speech signal may be of the following form:

$$y(n) = x(n) + v(n), \quad (1)$$

where x(n) and v(n) are, respectively, the clean speech of interest (also called the desired speech) and the additive noise, with n being the discrete-time index. The zero-mean signals x(n) and v(n) may be assumed to be mutually uncorrelated. The TCN may then be used to generate two signals from y(n): one for the left ear, denoted $y_L(n)$, and the other for the right ear, denoted $y_R(n)$, so that when the two signals are played back to the listener (e.g., either through a headset or a pair of loudspeakers), the signals x(n) and v(n) are rendered perceptually to be coming from different directions (e.g., opposite directions or orthogonal directions) with respect to a perceived center of the listener's head. This non-homophasic binaural presentation may significantly improve the intelligibility of the speech of interest with respect to a simple monaural presentation.

FIG. 1 shows a flow diagram illustrating a method 100 for generating binaural signals that contain speech and noise components which are rendered perceptually coming from non-homophasic directions, according to an implementation of the present disclosure. The method 100 may be performed by processing logic that comprises hardware (e.g., circuitry, dedicated logic, programmable logic, microcode, etc.), software (e.g., instructions run on a processing device to perform hardware simulation), or a combination thereof, such as computer system 700 as described below with respect to FIG. 7.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 1, at 102, the processing device may start executing any preliminary operations required for generating binaural signals rendered with non-homophasic speech and noise components.

These preliminary operations may, for example, include training a deep neural network (DNN) to learn how to output the binaural signals from a single-channel input speech signal that has been corrupted by additive noise, as described more fully below with respect to FIG. 2.

At 104, the processing device may receive a sound signal including speech and noise components, where the sound signal may be a single channel input (i.e., captured by a single microphone).

For example, a single microphone may be used for observations of a speech signal of interest wherein the speech signal is corrupted by added noise, e.g., a signal like that of equation (1) with speech and noise components.

At 106, the processing device may transform, using the DNN, the sound signal into a first signal and a second signal, wherein the transforming comprises:

At 108, the processing device may encode, by an encoding layer of the DNN, the sound signal into a sound signal representation in a latent space.

In one implementation, the encoding layer (e.g., encoder) may include a 1-dimensional convolution layer that maps the input sound signal into latent vectors representing features extracted from the sound signal.

At 110, the processing device may render, by a rendering layer of the DNN, the sound signal representation into a first signal representation and a second signal representation in the latent space.

In one implementation, the rendering layer (e.g., rendering network) may include a 1×1 convolution which is used as a bottleneck layer to reduce the dimension of the sound signal representation in the latent space. The main module of the rendering network may be a residual block which includes 3 convolutions, i.e., an input 1×1 convolution, a depth-wise separable convolution, and an output 1×1 convolution. The rendering network is described more fully below with respect to FIGS. 4A-4D.

At 112, the processing device may decode, by a decoding layer of the DNN, the first signal representation and the second signal representation into the first signal and the second signal, respectively.

In one implementation, the decoding layer (e.g., decoder) may include a 1-dimensional transposed convolution layer that reverses the process of the encoding convolutional layer, e.g., the decoder can be a mirror-function of the encoder.

At 114, the processing device may provide the first signal to a first speaker device and the second signal to a second speaker device, wherein the speech component and the noise component in the sound signal, when listened to binaurally using the first and second speaker devices, are rendered perceptually to be coming from non-homophasic directions.

As noted above, binaural presentations may be broadly classified into three types depending on the relative regions where the speech and noise components of the sound signal are rendered in a listener's perceptual space: antiphasic, heterophasic, and homophasic. Throughout this disclosure we refer to the antiphasic presentation and the heterophasic presentation as non-homophasic presentations where the speech component and noise component are rendered perceptually to be coming from different directions.

Figure 2:
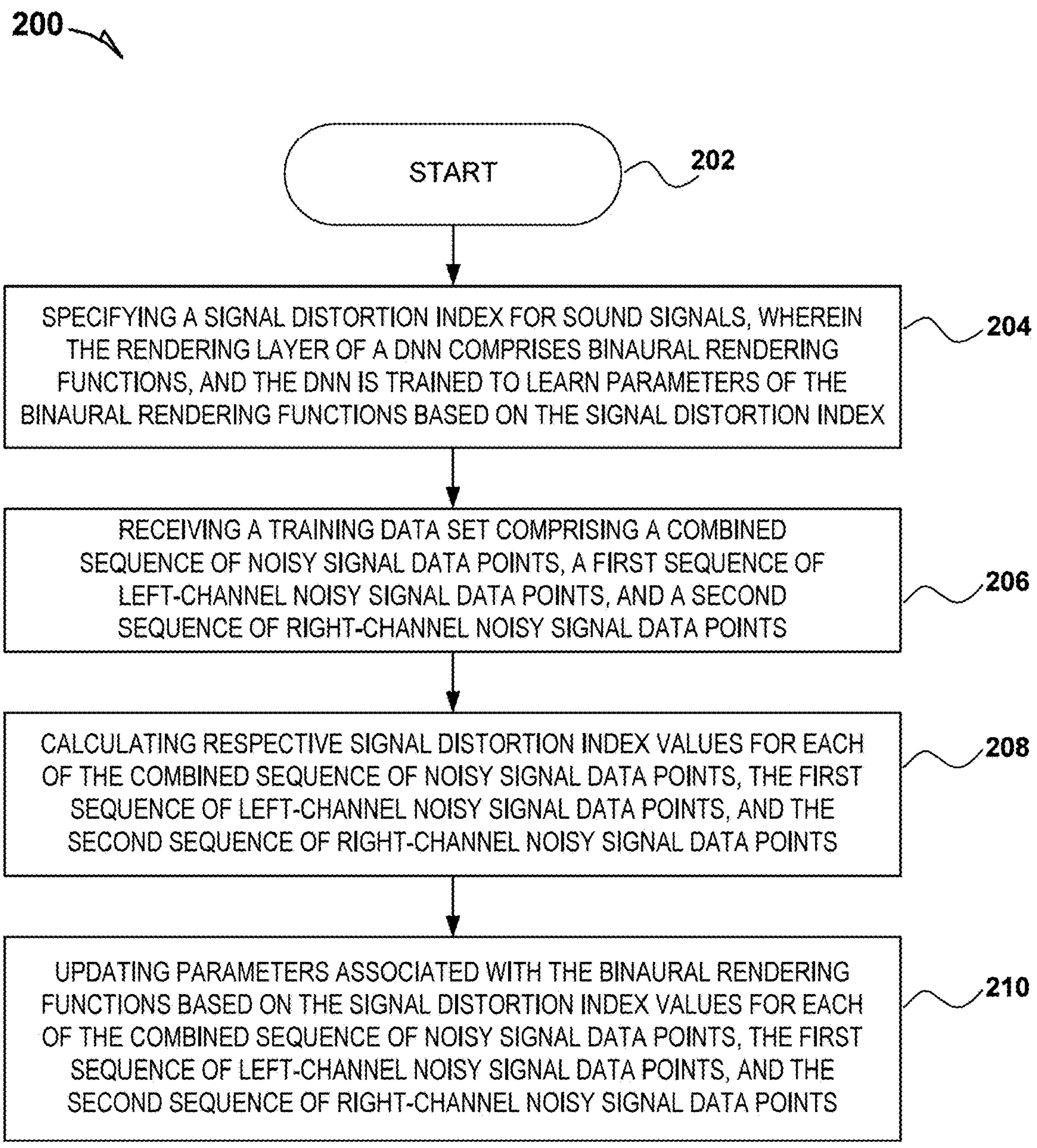
FIG. 2 shows a flow diagram illustrating a method for training a deep neural network (DNN) to learn binaural rendering functions based on a signal distortion index, according to an implementation of the present disclosure.

FIG. 2 shows a flow diagram illustrating a method 200 for training a deep neural network (DNN) to learn binaural rendering functions based on a signal distortion index, according to an implementation of the present disclosure.

Referring to FIG. 2, at 202, a processing device may start executing preliminary operations for training the DNN including an encoder, a rendering net, and a decoder. In one implementation, the rendering net may include binaural rendering functions characterized by parameters that may be learned based on a signal distortion index.

The processing device used for training the DNN may be the same processing device later used for speech enhancement with the DNN, as described above with respect to method 100 of FIG. 1, or it may be another different processing device. The preliminary operations may, for example, include generating a training dataset for training the DNN to output the binaural signals from a single-channel input noisy speech signal, as described more fully below with respect to FIG. 3.

At 204, the processing device may specify a signal distortion index for sound signals.

The signal distortion index may be used as the learning model training objective and may be specified as a function of learnable parameters of the DNN, e.g., parameters for learning binaural rendering functions. The signal distortion index for the left channel $y_L(n)$ (see equation (4b) below) may be defined as:

$$v_{sd,L}(w) = 10\log_{10}\left\{\frac{E[y_L(n)-\hat{y}_L(n)]^2}{E[y_L^2(n)]}\right\}, \tag{2}$$

where E[•] denotes mathematical expectation and w denotes learnable parameters of the DNN and the signal distortion index for the right channel (e.g., $v_{sd,R}(w)$) may be defined analogously to (2) above.

In other implementations, a source to distortion ratio (SDR) and/or a scale-invariant source-to-noise ratio (SI-SNR) may be used as the training objective for the DNN learning model.

At 206, the processing device may receive a training dataset comprising a combined sequence of noisy signal data points, a first sequence of left-channel noisy signal data points, and a second sequence of right-channel noisy signal data points.

As explained below with respect to method 300 of FIG. 3, the training dataset may be generated based on clean speech signals and noise signal available via publicly accessible databases.

The processing device may generate a binaural left noisy signal and a binaural right noisy signal (e.g., the first sequence of left-channel noisy signal data points and the second sequence of right-channel noisy signal data points) based on binaural room impulse responses (BRIRs) used as transfer functions for sound signals from the desired speech and noise rendering positions to the left and right ears of a listener in the room.

At 208, the processing device may calculate respective signal distortion index values for each of the combined sequence of noisy signal data points, the first sequence of left-channel noisy signal data points, and the second sequence of right-channel noisy signal data points.

As noted above, the signal distortion index (2) may be a function of learnable parameters of the DNN, e.g., parameters for binaural rendering functions to be learned.

At 210, the processing device may update parameters associated with the binaural rendering functions based on the signal distortion index values for each of the combined sequence of noisy signal data points, a first sequence of left-channel noisy signal data points, and a second sequence of right-channel noisy signal data points.

The training objective for the learning model may be defined as:

$$v_{sd}(w) = v_{sd,L}(w) + v_{sd,R}(w). \tag{3}$$

where w denotes learnable parameters of the DNN and the signal distortion index value for the combined noisy signal is equal to the sum of the signal distortion index values of the corresponding binaural left noisy signal and the corresponding binaural right noisy signal.

Figure 3:
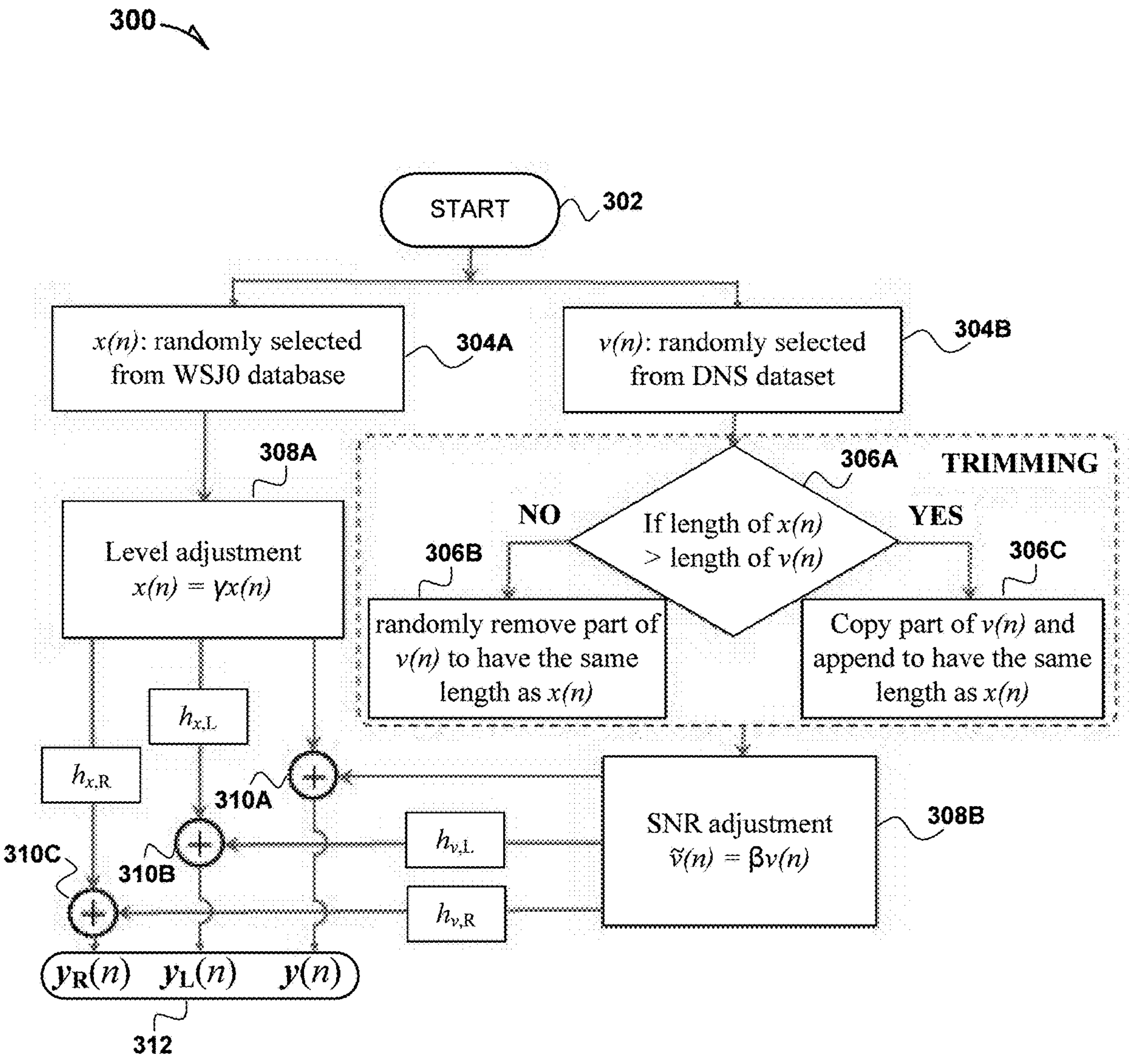
FIG. 3 shows a flow diagram illustrating a method for generating training data for the DNN based on clean speech signals and noise signals, according to an implementation of the present disclosure.

FIG. 3 shows a flow diagram illustrating a method 300 for generating training data for the DNN based on clean speech signals and noise signals, according to an implementation of the present disclosure.

The processing device used for generating training data for the DNN may be the same processing device later used for training the DNN (e.g., as in method 200 of FIG. 2) or the one later used for speech enhancement with the DNN (e.g., as in method 100 of FIG. 1) or it may be another different processing device. Referring to FIG. 3, at 302, the processing device may start executing preliminary operations for generating training data (e.g., the training dataset of method 200 of FIG. 2) for the DNN based on the clean speech signals and the noise signals.

For example, to generate the training data, clean speech and noise signals and binaural room impulse responses (BRIRs) are needed. In the experimental results described below, the clean speech signals were taken from the publicly available Wall Street Journal database (e.g., WSJ0). Noise signals were taken from the deep noise suppression (DNS) challenge dataset: "Interspeech 2021 deep noise suppression challenge," arXiv preprint arXiv:2101.01902,2021. BRIRs were selected from an open-access database captured in a reverberant concert hall: "360° binaural room impulse response (BRIR) database for 6DOF spatial perception research," J. Audio Eng. Soc., March 2019. All sound signals were sampled at 16 kHz. Detailed parameter configuration is shown in Table I below.

TABLE I

| | TRAINING SET | TEST SET |
|---|---|---|
| Speech Dataset | WSJ0 | MRT |
| Noise Dataset | DNS | NOISEX-92 |
| SNR (dB) | −15:1:30 | 10 |
| Energy Level (dB) | −35:1:−15 | — |

At 304A, the processing device may randomly select a speech signal (e.g., x(n)) from the WSJ0 database and measure a duration (e.g., length) of the speech signal.

At 304B, the processing device may randomly select a corresponding noise signal (e.g., v(n)) from the DNS dataset and measure a duration (e.g., length) of the corresponding noise signal.

At 306A, the processing device may determine whether the clean speech signal has a same duration as the corresponding noise signal and, if not, randomly select a portion of the corresponding noise signal with a duration that is equal to a difference between the durations of the clean speech signal and the corresponding noise signal. This selected portion will be used to make the length of v(n) identical to that of x(n), e.g., trimming.

At 306B, the processing device may remove the randomly selected portion of the corresponding noise signal from the corresponding noise signal based on the duration of the clean speech signal being shorter than the duration of the corresponding noise signal.

At 306C, the processing device may append the randomly selected portion of the corresponding noise signal to the corresponding noise signal based on the duration of the clean speech signal being longer than the duration of the corresponding noise signal.

At 308A, the processing device may rescale the clean speech signal so that a level (e.g., volume) of the clean speech signal is within a range between an upper threshold value and a lower threshold value.

To ensure convergence of the DNN training process, the clean speech signal x(n) is rescaled before combining it with the noise signal so that its level is between −35 dB and −15 dB. The scaling process may be expressed as is $\tilde{x}(n)=\gamma x(n)$, where $\gamma=10^{(\epsilon/20)}/\sigma_x$ with $\epsilon$ being a value randomly selected from between −35:1:−15 dB, and $$\sigma_x = \sqrt{E[\tilde{x}^2(n)]}$$

with E[•] denoting mathematical expectation.

At 308B, the processing device may rescale the trimmed corresponding noise signal so that a signal-to-noise ratio (SNR) is within a range between an upper threshold value and a lower threshold value.

The trimmed corresponding noise signal may be rescaled in order to control SNR, e.g., $\tilde{v}(n)=\beta v_{trim}(n)$, where $$\beta = 10^{-SNR/20}\sigma_{\tilde{x}}/\sigma_v,\ \sigma_{\tilde{x}} = \sqrt{E[\tilde{x}^2(n)]},\ \sigma_v = \sqrt{E[v_{trim}^2(n)]},$$

and SNR may be randomly chosen from between −15:1:30 dB.

At 310A, the processing device may generate the sequence of combined noisy signal data points by adding the level-adjusted speech signals and the trimmed level-adjusted corresponding noise signal noise signals together, e.g., y(n) as shown in equation 4a below.

At 310B, the processing device may generate the corresponding first sequence of binaural left noisy signal data points using binaural room impulse responses (BRIRs) used as transfer functions for sound signals from the desired speech and noise rendering positions to a left ear location of a listener in the room (e.g., $h_{x,L}(n)$ and $h_{v,L}(n)$), as shown and described with respect to equation 4b below.

At 310C, the processing device may generate the corresponding second sequence of binaural right noisy signal data points using BRIRs used as transfer functions for sound signals from the desired speech and noise rendering positions to a right ear location of the listener in the room (e.g., $h_{x,R}(n)$ and $h_{v,R}(n)$), as shown and described with respect to equation 4c below.

Accordingly, the combined noisy signal (4a), the binaural left noisy signal (4b) and the binaural right noisy signal (4C), respectively, may be generated as:

$$y(n) = \tilde{x}(n) + \tilde{v}(n), \tag{4a}$$

$$y_L(n) = \tilde{x}(n) * h_{x,L}(n) + \tilde{v}(n) * h_{v,L}(n), \tag{4b}$$

$$y_R(n) = \tilde{x}(n) * h_{x,R}(n) + \tilde{v}(n) * h_{v,R}(n), \tag{4c}$$

where hx,L(n), hx,R(n), hv,L(n) and hv,R(n) are, respectively, the binaural room impulse responses (left and right channels) from the desired speech and noise rendering positions to the positions of the left and right ears of the listener in the room. These BRIRs may be obtained experimentally, for example, by measuring in a defined space such as a concert hall. In some implementations, such as in the training stage, the BRIRs used may be obtained from open-source databases.

At 312, the processing device may generate the training dataset based on the sequence of combined noisy signal data points, the first sequence of left-channel noisy signal data points and the second sequence of right-channel noisy signal data points.

FIGS. 4A-4D show: a data flow for training a DNN architecture, the 1-D convolution block of the DNN, an example of dilated convolution, and an example of single-input/binaural-output (SIBO) enhancement, according to implementations of this disclosure.

Figure 4A:
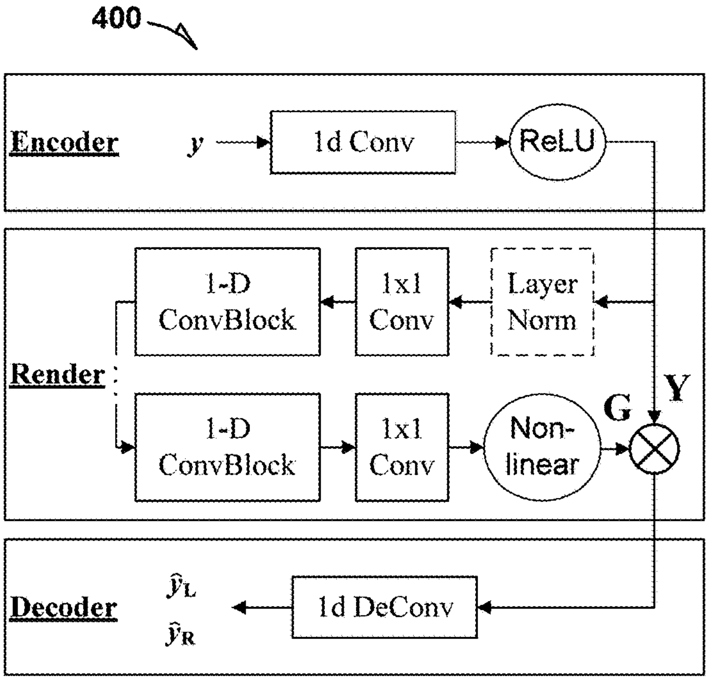
FIGS. 4A-4D show: a data flow for training a DNN architecture, the 1-D convolution block of the DNN, an example of dilated convolution, and an example of single-input/binaural-output (SIBO) enhancement, according to implementations of this disclosure.

Referring to FIG. 4A, it shows a data flow for training a DNN 400 architecture in the form of a temporal convolutional network (TCN) which includes an encoder, a rendering network, and a decoder.

The encoder may comprise a 1-dimensional convolution layer with kernel size of L=40 and stride S=20, followed by a rectified linear unit activation (ReLU). The encoder may map the input noisy observation sequence (the length may be set to 4 seconds in the DNN training process while it may be any value during the speech enhancing process) y=[y(1) y(2) . . . y(T0)]T, into latent vectors of dimension d0=256. This generates a latent representation of y, denoted Y∈ $\mathbb{R}^{d_0 \times T_1}$, where T1 is the sequence length after convolution.

The rendering network may begin with a 1×1 convolution (with kernel size and stride being 1), which is used as a bottleneck layer to decrease the dimension from d0 to d1. The main module of the rendering network may comprise 32 repeats of a residual block denoted as 1-D ConvBlock, as described with respect to FIG. 4B below. The last 1×1 convolution in the rendering network is to change the dimension from d1 to 2d0. After the last parametric ReLU nonlinearity operation, the network has mapped $$G = \begin{bmatrix} G_L \\ G_R \end{bmatrix},$$

a 2d0×T1 matrix, which behaves like the transfer functions for the left and right channels. The output of the rendering network is the stack of YL∈ $\mathbb{R}^{d_0 \times T_1}$ and YR∈ $\mathbb{R}^{d_0 \times T_1}$, where YL=GL⊙Y and YR=GR⊙Y are the latent space representations of the binaural signals for the left ear and right ear, respectively, and ⊙ is the elementwise multiplication.

The decoder reconstructs the waveform (e.g., of the latent space representations of the binaural signals for the left ear and right ear, respectively) from their latent representations using a deconvolution operation, which is a mirror-image of the encoder convolution. The decoder maps YL into $\hat{y}_L$=[$\hat{y}_L$(1)$\hat{y}_L$(2) . . . $\hat{y}_L$(T0)]T and YR into $\hat{y}_R$=[$\hat{y}_R$(1)$\hat{y}_R$(2) . . . $\hat{y}_R$(T0)]T.

Figure 4B:
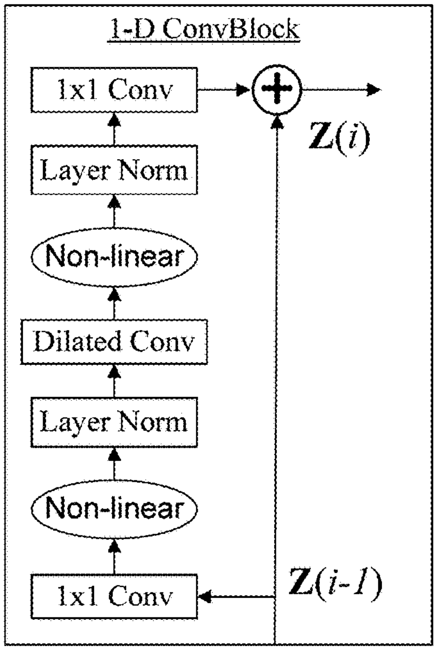

Referring to FIG. 4B, it shows the 1-D convolution block of the DNN 400 of FIG. 4A, as described above.

The 1-D ConvBlock may consists of 3 convolutions, i.e., an input 1×1 convolution, a depthwise separable convolution, and an output 1×1 convolution. The input 1×1 convolution may be used to change the dimension from d1 to d2 and the output 1×1 convolution may be used to get back to the original dimension, d1. The dimensions may be set to d1=d2=256. The depthwise convolution may be used to further reduce the number of parameters, which maintains the dimension unchanged while being computationally more efficient than a standard convolution. The dilation factor of the depthwise convolution of the ith 1-D ConvBlock is 2 mod(i−1, 8), i.e., every 8 blocks, the dilation factor is reset to 1, which allows multiple fine-to-coarse-to-fine interactions across the time T1. The input and the depthwise convolution are followed by parametric ReLU nonlinearity and batch normalization operation.

Figure 4C:
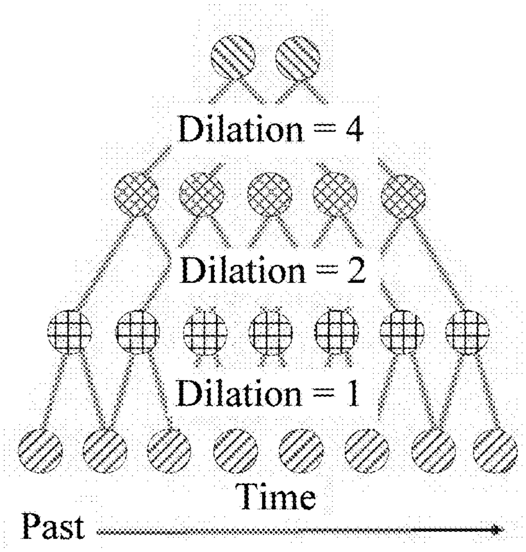
Figure 4D:
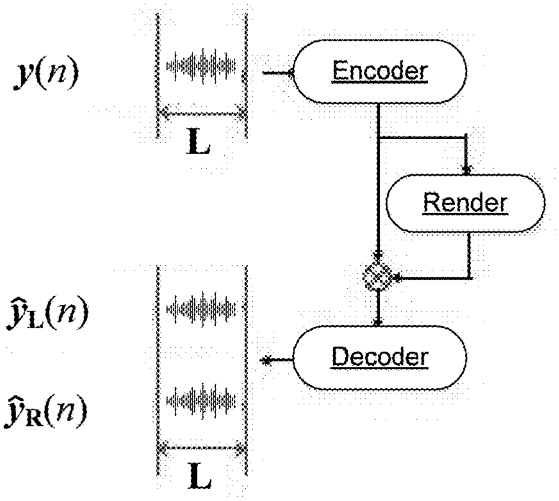

Referring to FIG. 4C, it shows an example of dilated convolution over time with a kernel size of 2.

Referring to FIG. 4C, shows an example of single-input/binaural-output (SIBO) speech enhancement with the TCN architecture of DNN 400, as described above with respect to FIG. 4A.

FIGS. 5A-5D show the results of testing a listener's perception of direction for the speech and noise components of the generated binaural signals, according to implementations of the present disclosure.

The modified rhyme test (MRT) may be adopted to evaluate speech enhancement performance. The MRT is an ANSI standard for measuring the intelligibility of speech through listening tests. Based on an MRT standard, 50 sets of rhyming words are created with each set consisting of 6 words. Words in some sets rhyme in a strict sense, e.g., [thaw, law, raw, paw, jaw, saw], while those in other sets may rhyme in a more general sense, e.g., [sum, sun, sung, sup, sub, sud]. In the MRT dataset, each word is presented in a carrier sentence: "Please select the word—," so that the word "law" would be presented as "Please select the word law." Test sentences were recorded by 4 female and 5 male native English speakers and each of them may record 300 sentences, consisting of 50 sets of 6 words, in the standard carrier sentence form. In total, 2700 recordings are in the dataset. During testing, listeners are asked to select the word they hear from a set of six sentences. Intelligibility is considered to be higher when the listeners gives more right answers.

In the experiments described herein, only 12 sets from each speaker were selected with only one sentence in each set. Therefore, 48 clean MRT sentences are used in the experiments. For each sentence, the clean speech was mixed with "buccaneer1," "babble," and "pink" noise from NOISEX-92 dataset (Speech Commun., vol. 12, no. 3, pp. 247-253, July 1993) at an SNR of 10 dB. These same noise signals are not used in the training stage of the DNN, described above with respect to FIG. 2.

For the purpose of comparing the methodologies described herein to other speech enhancement methods the following other such methods were selected: the optimally-modified-log-spectral-amplitude (OMLSA) method and a waveform domain TCN based monaural speech enhancement algorithm, which is denoted as TCN-SISO.

The learning rate for training TCN-SIBO and TCN-SISO is set to be 10-3 for the first epoch, and decrease to be half if the loss in validation set does not decrease in the next 3 consecutive epochs.

Figure 5A:
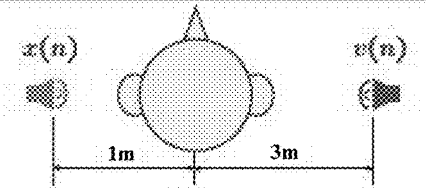
FIGS. 5A-5D show the results of testing a listener's perception of direction for the speech and noise components of the generated binaural signals, according to implementations of the present disclosure.
Figure 5B:
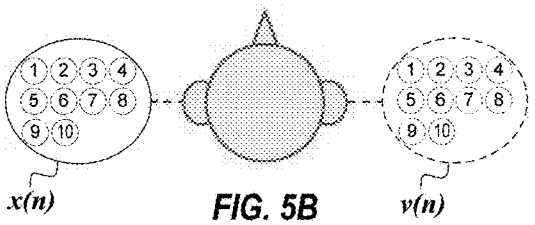

Before the MRT test, the speech and noise must be rendered to the desired non-homophasic directions. A noisy signal was recorded in a babbling noise environment where the clean speech is from a high-fidelity loudspeaker, which plays back a pre-recorded high quality clean speech signal. Two DNNs were trained: one was designed to render speech at 1 m to the left-hand side of the head (−90°) while noise at 3 m to the right-hand side of the head (90°) as illustrated in FIG. 5A, and the other to render speech in the middle of the head (0°), while noise at 1 m to the right-hand side of the head (90°) as illustrated in FIG. 5B. The recorded noisy speech signal was passed through the aforementioned two DNNs. 10 normal hearing participants, whose age are between 22-32, were asked to choose the direction (from 3 choices, i.e., left, right, and middle) of the speech and noise of the network outputs after listening to the enhanced speech binaural signals output by each of the DNNs.

Figure 5C:
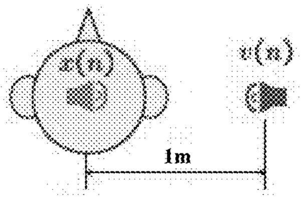
Figure 5D:
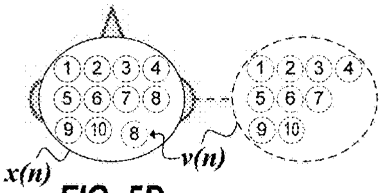

The results are shown in FIG. 5C and FIG. 5D where the x(n) numbers (e.g., solid lines) denote the corresponding listener's choice for the speech direction, and the v(n) numbers (e.g., dashed lines) denote the corresponding listener's choice for the for noise direction. As shown, for the left-right antiphasic binaural presentation setup, all participants chose the correct directions of both speech and noise, while for the middle-right heterophasic binaural presentation setup, only one listener (e.g., listener 8) chose the wrong direction for the noise e.g., v(n). These results indicate that the designed networks are able to render speech and noise to the desired directions.

Figure 6:
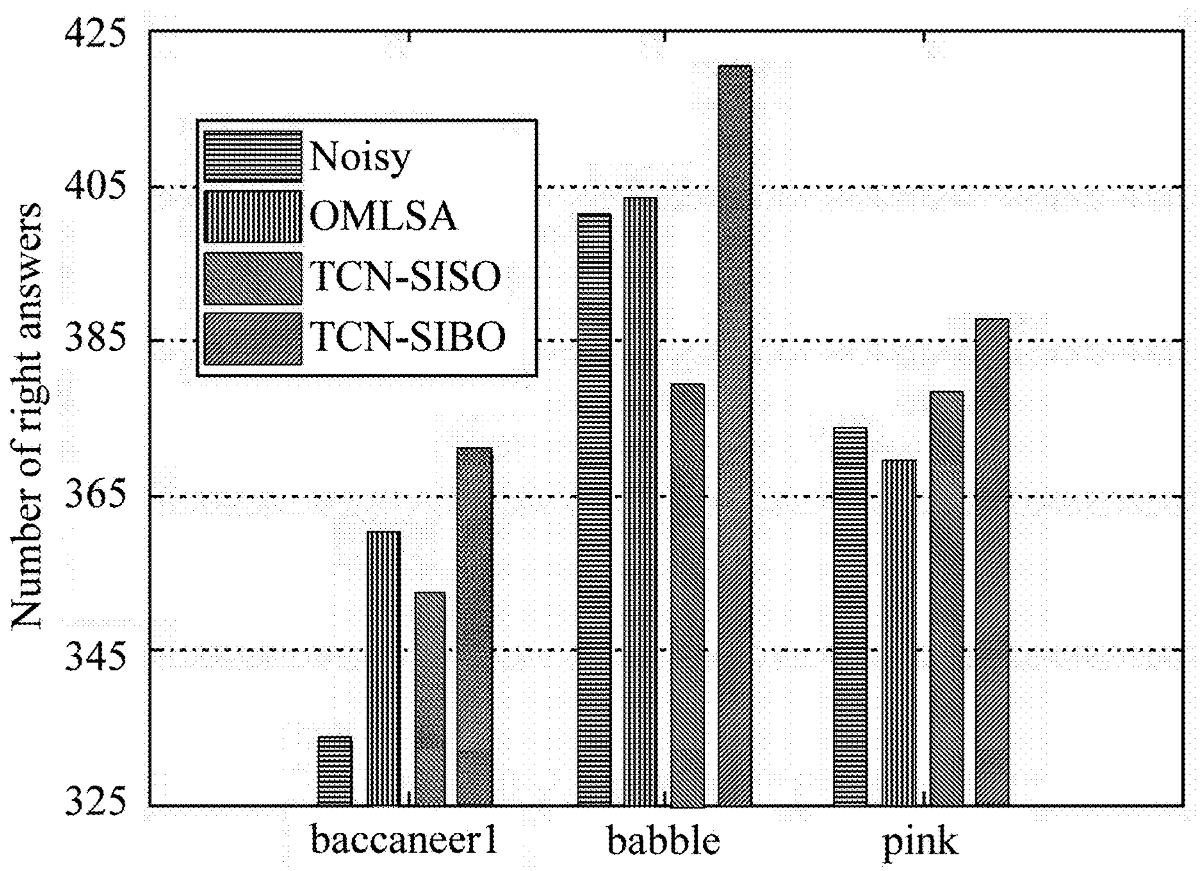
FIG. 6 shows a graph plotting a listener's number of correctly recognized speech signals from an original noisy speech signal and from several enhanced versions of the original noisy speech signals.

FIG. 6 shows a graph 600 plotting a listener's number of correctly recognized speech signals from an original noisy speech signal and from several enhanced versions of the original noisy speech signal.

All the signals in the test sets described above were normalized to the same level, and enhanced by 3 studied algorithms: OMLSA, TCN-SISO, and TCN-SIBO. For TCNSIBO, the left-right setup for binaural presentation shown in FIG. 5A is used for MRT. The evaluation task was published in Amazon machine Turk (mTurk). Each signal (sentence) was listened to by 10 different participants from mTurk. All participants were instructed to wear headphones to listen to the signals and select the word they hear. The listener could adjust the volume according to his/her preference. Guessing was allowed.

Graph 600 plots the number of right answers collected from the listener's answer sheets for MRT of the noisy and enhanced speech signals.

The TCN-SIBO method described herein outperformed the OMLSA and TCN-SISO in MRT by a large margin for all three noise conditions. The number of right answers for TCN-SISO in babble noise and that of OMLSA in pink noise were less than those of the noisy signal, which indicates that these two methods may distort the speech signal to some extent, leading to intelligibility degradation. Moreover, compared with TCN-SISO, the TCN-SIBO method described herein generalizes better to new speech and noise data with only 20 hours of training data.

The MRT results show that the proposed method is able to increase speech intelligibility by a significant margin as compared to the other two methods. Furthermore, since TCN-SIBO only needs to learn binaural rendering functions, it is more robust to unseen speech and noise data than other deep learning based noise reduction algorithms.

Figure 7:
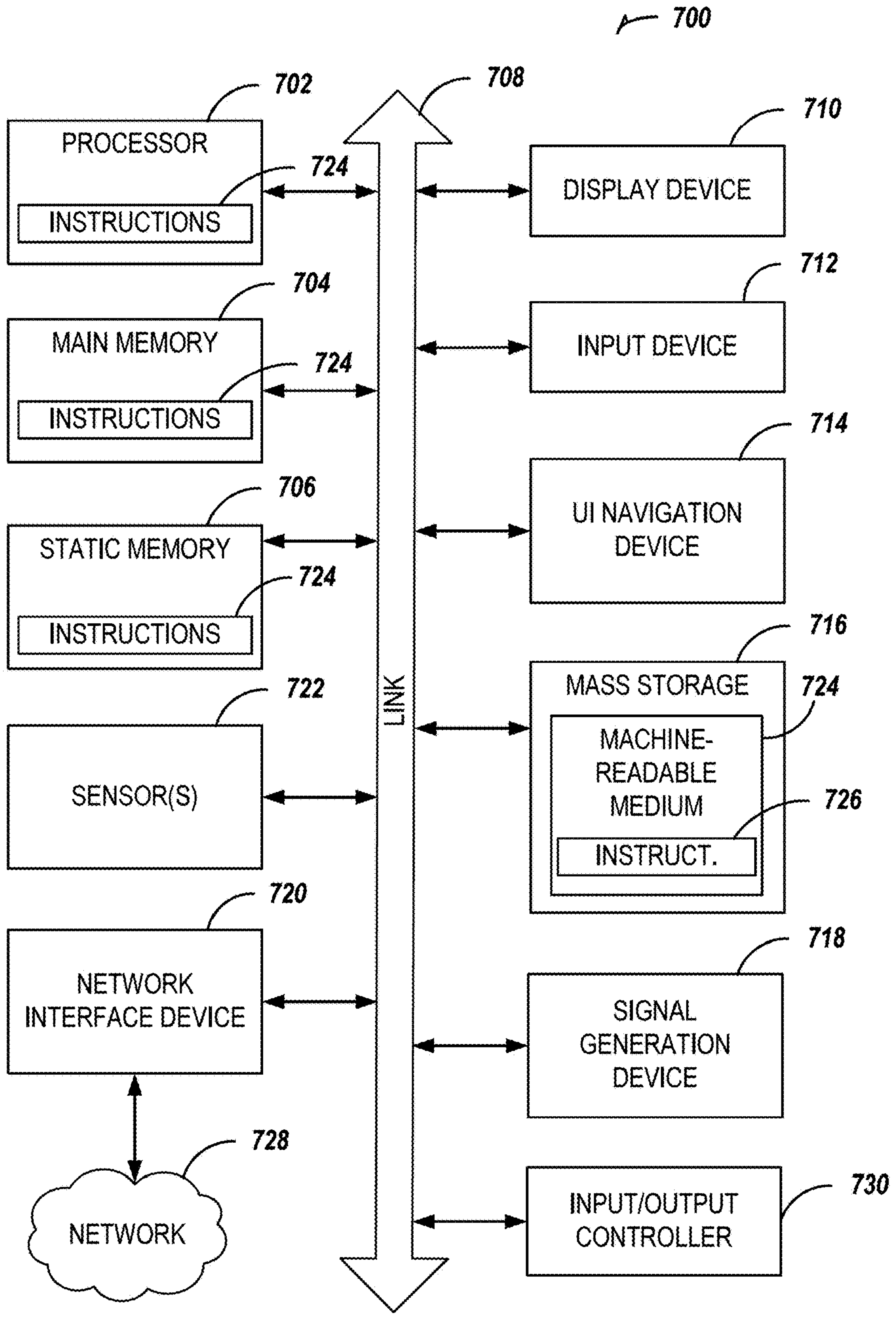
FIG. 7 shows a block diagram illustrating an exemplary computer system, according to an implementation of the present disclosure.

FIG. 7 is a block diagram illustrating a machine in the example form of a computer system 700, within which a set or sequence of instructions may be executed to cause the machine to perform any one of the methodologies discussed herein, according to an example implementation.

In alternative implementations, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one implementation, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors 722, such as a global positioning system (GPS) sensor, accelerometer, gyrometer, magnetometer, or other types of sensors.

The storage device 716 includes a machine-readable medium 724 on which is stored one or more sets of data structures and instructions 726 (e.g., software) embodying or utilized by any one or more of the methodologies or functions described herein. The instructions 726 may also reside, completely or at least partially, within the main memory 704, static memory 706, and/or within the processor 702 during execution thereof by the computer system 700, with main memory 704, static memory 706, and processor 702 comprising machine-readable media.

While the machine-readable medium 724 is illustrated in an example implementation to be a single medium, the term "machine-readable medium" may include a single medium or multiple media (e.g., a centralized or distributed database, and/or associated caches and servers) that store the one or more instructions 726. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 726 may further be transmitted or received over a communications network 728 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog signals or other intangible medium to facilitate communication of such software instructions.

Example computer system 700 may also include an input/output controller 730 to receive input and output requests from the at least one central processor 702, and then send device-specific control signals to the device they control. The input/output controller 730 may free the at least one central processor 702 from having to deal with the details of controlling each separate kind of device.

Language: In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout the disclosure is not intended to mean the same implementation or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations/implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method for generating binaural signals, the method comprising:

receiving, by a processing device, a sound signal including speech and noise components; and transforming, by the processing device using a deep neural network (DNN), the sound signal into a first signal and a second signal, wherein the DNN comprises an encoding layer, a rendering layer, and a decoding layer, the transforming comprises:

encoding, by the encoding layer of the DNN, the sound signal into a sound signal representation in a latent space, wherein the latent space includes vectors representing features extracted from the sound signal;

rendering, by the rendering layer of the DNN, the sound signal representation into a first signal representation and a second signal representation in the latent space, wherein the rendering layer of the DNN comprises binaural rendering functions, and the DNN is trained to learn parameters of the binaural rendering functions based on a signal distortion index, wherein the method further comprises:

specifying, by a processing device, the signal distortion index for sound signals;

receiving, by the processing device, a training dataset comprising a combined sequence of noisy signal data points, a first sequence of left-channel noisy signal data points, and a second sequence of right-channel noisy signal data points;

calculating, by the processing device, signal distortion index values for each of the combined sequence of noisy signal data points, the first sequence of left-channel noisy signal data points, and the second sequence of right-channel noisy signal data points;

updating the parameters of the binaural rendering functions based on the signal distortion index values for each of the combined sequence of noisy signal data points, the first sequence of left-channel noisy signal data points, and the second sequence of right-channel noisy signal data points, wherein the method further comprises:

measuring a duration of each of clean speech signals and each of noise signals;

selecting, for each clean speech signal and a corresponding noise signal, a portion of the corresponding noise signal with a duration that is equal to a difference between the duration of the clean speech signal and the duration of the corresponding noise signal;

trimming the corresponding noise signal, wherein the trimming further comprises: removing the selected portion of the corresponding noise signal based on the duration of the clean speech signal being shorter than the duration of the corresponding noise signal; and appending a copy of the selected portion to the corresponding noise signal based on the duration of clean speech signal being shorter than the duration of the corresponding noise signal; and generating the combined sequence of noisy signal data points based on the clean speech signals and the trimmed corresponding noise signals; and decoding, by the decoding layer of the DNN, the first signal representation into the first signal and the second signal representation into the second signal.

2. The method of claim 1, further comprising:

providing the first signal to a first speaker device and the second signal to a second speaker device, wherein the speech component and the noise component in the sound signal, when listened to binaurally using the first and second speaker devices, are rendered perceptually coming from non-homophasic directions.

3. The method of claim 2, wherein the speech component and the noise component in the sound signal, when listened to binaurally using the first and second speaker devices, are rendered perceptually coming from one of opposite directions or orthogonal directions.

4. The method of claim 1, wherein the decoding of the first signal representation into the first signal and the second signal representation into the second signal comprises reconstructing a first waveform signal from the first signal representation and a second waveform signal from the second signal representation.

5. The method of claim 1, wherein the parameters are updated based on signal distortion index values for noisy signal data points being equal to a sum of signal distortion index values for corresponding left-channel and right-channel noisy signal data points.

6. The method of claim 1, further comprising rescaling a volume of the clean speech signals so that a volume of each clean speech signal is within a range between an upper threshold value and a lower threshold value.

7. The method of claim 1, further comprising rescaling the trimmed corresponding noise signals so that a signal-to-noise ratio (SNR) is within a range between an upper threshold value and a lower threshold value.

8. The method of claim 1, further comprising:

filtering, using a first left binaural room impulse response (BRIR) function, the clean speech signals to generate a sequence of left-channel clean speech signal data points and filtering, using a first right BRIR function, the clean speech signals to generate a sequence of right-channel clean speech signal data points;

filtering, using a second left BRIR function, the sequence of trimmed corresponding noise signals to generate a sequence of left-channel trimmed corresponding noise signals and filtering, using a second right BRIR function, the sequence of trimmed corresponding noise signals to generate a sequence of right-channel trimmed corresponding noise signal data points;

combining the sequence of left-channel clean speech signal data points and the sequence of left-channel trimmed corresponding noise signal data points to generate the first sequence of left-channel noisy signal data points; and combining the sequence of right-channel clean speech signal data points and the sequence of right-channel trimmed corresponding noise signal data points to generate the second sequence of right-channel noisy signal data points.

9. A system for generating binaural signals, the system comprising:

a processing device, communicatively coupled to a microphone, to:

receive a sound signal including speech and noise components; and transform, using a deep neural network (DNN), the sound signal into a first signal and a second signal, wherein the DNN comprises an encoding layer, a rendering layer, and a decoding layer, and to transform the sound signal, the processing device is further to:

encode, using the encoding layer of the DNN, the sound signal into a sound signal representation in a latent space, wherein the latent space includes vectors representing features extracted from the sound signal;

render, using the rendering layer of the DNN, the sound signal representation into a first signal representation and a second signal representation, wherein the rendering layer of the DNN comprises binaural rendering functions, and the DNN is trained to learn parameters of the binaural rendering functions based on a signal distortion index, wherein the processing device is further to:

specify the signal distortion index for sound signals;

receive a training dataset comprising a combined sequence of noisy signal data points, a first sequence of left-channel noisy signal data points, and a second sequence of right-channel noisy signal data points;

calculate respective signal distortion index values for each of the combined sequence of noisy signal data points, the first sequence of left-channel noisy signal data points, and the second sequence of right-channel noisy signal data points; and update the parameters of the binaural rendering functions based on the signal distortion index values for each of the combined sequence of noisy signal data points, the first sequence of left-channel noisy signal data points, and the second sequence of right-channel noisy signal data points, wherein the processing device is further to:

measure a duration of each of clean speech signals and each of noise signals;

select, for each clean speech signal and a corresponding noise signal, a portion of the corresponding noise signal with a duration that is equal to a difference between the duration of the clean speech signal and the duration of the corresponding noise signal;

trim the corresponding noise signal, wherein to trim the corresponding noise signal, the processing device is further to remove the selected portion of the corresponding noise signal based on the duration of the clean speech signal being shorter than the duration of the corresponding noise signal; and append a copy of the selected portion to the corresponding noise signal based on the duration of clean speech signal being shorter than the duration of the corresponding noise signal; and generate the combined sequence of noisy signal data points based on the clean speech signals and the trimmed corresponding noise signals; and decode, using the decoder layer of the DNN, the first signal representation into the first signal and the second signal representation into the second signal.

10. The system of claim 9, wherein the processing device is further to:

provide the first signal to a first speaker device and the second signal to a second speaker device, wherein the speech component and the noise component in the sound signal, when listened to binaurally using the first and second speaker devices, are rendered perceptually coming from non-homophasic directions.

11. The system of claim 10, wherein the speech component and the noise component in the sound signal, when listened to binaurally using the first and second speaker devices, are rendered perceptually coming from one of opposite directions or orthogonal directions.

12. The system of claim 9, wherein to decode the first signal representation into the first signal and the second signal representation into the second signal, the processing device is further to reconstruct a first waveform signal from the first signal representation and a second waveform signal from the second signal representation.

13. A non-transitory machine-readable storage medium storing instructions for generating binaural signals which, when executed, cause a processing device to:

receive a sound signal including speech and noise components; and transform, using a deep neural network (DNN), the sound signal into a first signal and a second signal, wherein the DNN comprises an encoding layer, a rendering layer, and a decoding layer, and to transform the sound signal, the instructions, when executed, further cause the processing device to:

encode, using the encoding layer of the DNN, the sound signal into a sound signal representation in a latent space, wherein the latent space includes vectors representing features extracted from the sound signal;

render, using the rendering layer of the DNN, the sound signal representation into a first signal representation and a second signal representation in the latent space, wherein the rendering layer of the DNN comprises binaural rendering functions, and the DNN is trained to learn parameters of the binaural rendering functions based on a signal distortion index, wherein the processing device is further to:

specify the signal distortion index for sound signals;

receive a training dataset comprising a combined sequence of noisy signal data points, a first sequence of left-channel noisy signal data points, and a second sequence of right-channel noisy signal data points;

calculate respective signal distortion index values for each of the combined sequence of noisy signal data points, the first sequence of left-channel noisy signal data points, and the second sequence of right-channel noisy signal data points; and update the parameters of the binaural rendering functions based on the signal distortion index values for each of the combined sequence of noisy signal data points, the first sequence of left-channel noisy signal data points, and the second sequence of right-channel noisy signal data points, wherein the processing device is further to:

measure a duration of each of clean speech signals and each of noise signals;

select, for each clean speech signal and a corresponding noise signal, a portion of the corresponding noise signal with a duration that is equal to a difference between the duration of the clean speech signal and the duration of the corresponding noise signal;

trim the corresponding noise signal, wherein to trim the corresponding noise signal, the processing device is further to remove the selected portion of the corresponding noise signal based on the duration of the clean speech signal being shorter than the duration of the corresponding noise signal; and append a copy of the selected portion to the corresponding noise signal based on the duration of clean speech signal being shorter than the duration of the corresponding noise signal; and generate the combined sequence of noisy signal data points based on the clean speech signals and the trimmed corresponding noise signals; and decode, using the decoding layer of the DNN, the first signal representation into the first signal and the second signal representation into the second signal.

14. The non-transitory machine-readable storage medium of claim 13, wherein the instructions, when executed, further cause the processing device to:

provide the first signal to a first speaker device and the second signal to a second speaker device, wherein the speech component and the noise component in the sound signal, when listened to binaurally using the first and second speaker devices, are rendered perceptually coming from non-homophasic directions.

15. The non-transitory machine-readable storage medium of claim 14, wherein the speech component and the noise component in the sound signal, when listened to binaurally using the first and second speaker devices, are rendered perceptually coming from one of opposite directions or orthogonal directions.

16. The non-transitory machine-readable storage medium of claim 13, wherein to decode the first signal representation into the first signal and the second signal representation into the second signal, the instructions further causes the processing device to reconstruct a first waveform signal from the first signal representation and a second waveform signal from the second signal representation.

* * * * *